(12) United States Patent
Barre

(10) Patent No.: US 11,878,356 B2
(45) Date of Patent: Jan. 23, 2024

(54) DEVICE AND METHOD FOR DEBURRING AT LEAST ONE BOREHOLE OPENING OF A METAL WORKPIECE

(71) Applicant: ZF Friedrichshafen AG, Friedrichshafen (DE)

(72) Inventor: Martin Barre, Blies-Schweyen (FR)

(73) Assignee: ZF Friedrichshafen AG, Friedrichshafen (DE)

( * ) Notice: Subject to any disclaimer, the term of this patent is extended or adjusted under 35 U.S.C. 154(b) by 169 days.

(21) Appl. No.: 17/441,883

(22) PCT Filed: Mar. 20, 2020

(86) PCT No.: PCT/EP2020/057838
§ 371 (c)(1),
(2) Date: Sep. 22, 2021

(87) PCT Pub. No.: WO2020/193424
PCT Pub. Date: Oct. 1, 2020

(65) Prior Publication Data
US 2022/0193793 A1    Jun. 23, 2022

(30) Foreign Application Priority Data
Mar. 22, 2019 (DE) .......................... 102019203948.0

(51) Int. Cl.
*B23B 51/10* (2006.01)
(52) U.S. Cl.
CPC ........ *B23B 51/101* (2013.01); *B23B 2251/64* (2013.01)

(58) Field of Classification Search
CPC ..... B23B 51/101; B23B 51/103; B23B 51/10; B23B 2220/08; B23B 2251/64; B23C 3/124; B23C 2220/20; B23C 2210/72
See application file for complete search history.

(56) References Cited

U.S. PATENT DOCUMENTS

| 1,072,543 | A | * | 9/1913 | Whyte | B23B 51/00 |
| | | | | | 408/227 |
| 2005/0095072 | A1 | | 5/2005 | Gaiser et al. | |
| 2015/0063933 | A1 | * | 3/2015 | Faessler | B23D 79/023 |
| | | | | | 408/1 R |

(Continued)

FOREIGN PATENT DOCUMENTS

| DE | 2838516 A1 | 4/1980 |
| DE | 3517147 A1 | 11/1986 |

(Continued)

OTHER PUBLICATIONS

International Search Report and Written Opinion for PCT/EP2020/057838 dated Jul. 7, 2020 (13 pages; with English translation).

*Primary Examiner* — Alan Snyder
(74) *Attorney, Agent, or Firm* — Kristin L. Murphy

(57) ABSTRACT

The disclosure relates to a device for deburring at least one borehole opening of a metal workpiece, wherein the device has a rotationally symmetrical countersink bit. The countersink bit of the device is designed to remove at least one burr of the at least one borehole opening. The countersink bit can be introduced into an opening forming the at least one borehole opening and rotated. The disclosure also relates to a corresponding method.

14 Claims, 2 Drawing Sheets

(56) References Cited

U.S. PATENT DOCUMENTS

2017/0282258 A1  10/2017  Ohno

FOREIGN PATENT DOCUMENTS

| DE | 602004006331 T2 | 1/2008 |
| DE | 102009034270 A1 | 2/2011 |
| EP | 1779950 A1 | 5/2007 |
| EP | 3616817 A1 | 3/2020 |
| WO | 2019042491 A1 | 3/2019 |

* cited by examiner

DEVICE AND METHOD FOR DEBURRING AT LEAST ONE BOREHOLE OPENING OF A METAL WORKPIECE

CROSS-REFERENCE TO RELATED APPLICATIONS

This application is a national stage of International Application No. PCT/EP2020/057838, filed Mar. 20, 2020, the disclosure of which is incorporated herein by reference in its entirety, and which claimed priority to German Patent Application No. 102019203948.0, filed Mar. 22, 2019, the disclosure of which is incorporated herein by reference in its entirety.

TECHNICAL FIELD

The present disclosure relates to a device for deburring at least one borehole in a metal workpiece, and to a method for deburring at least one borehole in a metal workpiece.

BACKGROUND

In the prior art, it is known to deburr metal workpieces before they are processed further or at least before they are used in a for example larger assembly. Since a burr is often comparatively narrow with one or more sharp edges, the removal of the burr serves to reduce the risk of injury to people who come into contact with the workpiece. However, when the workpiece is subsequently used in an assembly made up of a multiplicity of different workpieces, the burr can also detach from the workpiece through the operation of the assembly. Accordingly, the removal of the burr also serves primarily to reduce the risk of the assembly being damaged and breaking down. For example, a workpiece in the form of a metal gearwheel can, after it has been installed in a transmission, lead to damage of the transmission if a burr of the gearwheel detaches from the gearwheel and blocks the transmission.

In this context, DE 28 38 516 A1 describes a method and a device for removing a burr from workpieces, in particular from the end of tubular workpieces formed by rotary swaging on a mandrel. According to DE 28 38 516 A1, a burr that has arisen during forming is bent down into a shoulder of the mandrel by the forming tool and is then sheared off by axial movement of the mandrel.

DE 60 2004 006 331 T1 discloses a device for deburring forgings, in particular crankshafts. The device has an upper cutting punch that is integrated in a vertically movable slide. A lower cutting punch traverses a lower cutting plate on the base of the upper cutting punch. The lower cutting punch cooperates with the lower cutting plate in order to remove a burr from a crankshaft when the crankshaft comes into contact with the cutting plate and in order to orient the crankshaft retained between the two cutting punches.

The known devices for deburring metal workpieces have drawbacks, however, in that they do not allow the simultaneous deburring of a plurality of locations with burrs.

What is needed is an improved device for deburring at least one borehole in a metal workpiece.

SUMMARY

A device for deburring at least one borehole in a metal workpiece is disclosed herein.

In one exemplary arrangement, the disclosure relates to a device for deburring at least one borehole in a metal workpiece, wherein the device has a rotationally symmetric form cutter. The device is noteworthy in that the form cutter is configured to remove at least one burr from the at least one borehole in that it is able to be plunged into an opening intersecting the at least one borehole and rotated.

The disclosure thus describes a device which is configured to remove one or more burrs from one or more boreholes simultaneously by a form cutter. The form cutter is, however, not plunged into the borehole that has the burr, but rather into an opening intersecting the borehole, i.e. an opening that is in contact with the borehole and partially overlaps the borehole. For the actual deburring operation, the form cutter is then rotated, with the result that burrs that are present are removed.

This results in an advantage that the at least one burr can be removed easily and in a very time-saving manner by the disclosed device according to the disclosure, and in particular a multiplicity of burrs can be removed simultaneously by the device according to the disclosure.

The disclosure makes use of the observation that a burr usually protrudes only in that circumferential region of the at least one borehole that overlaps the circular area of the opening intersecting the at least one borehole. However, on account of the configuration of the workpiece or the arrangement of the boreholes, this circumferential region—even in the case of a multiplicity of boreholes—is always in a radius of action of the form cutter, and so a multiplicity of burrs can be removed in a single operation, namely the lowering of the form cutter and rotation of the form cutter.

The opening intersecting the at least one borehole is what is known as a centering bore, which is configured to at least partially receive the form cutter and, through cooperation of a geometric makeup of the centering bore and the geometric makeup of the form cutter, orient the latter such that a longitudinal axis of the form cutter lies coaxially with a longitudinal axis of the centering bore.

In one exemplary arrangement, the at least one borehole or the centering bore has a parabolic internal face. The parabolic internal face is able to be produced a suitably configured drill bit, in particular by a parabolic drill bit.

Since the opening intersecting the at least one borehole is a centering bore, i.e. a bore for better handling of the workpiece in a manufacturing process, it is advantageously not necessary for a separate bore to be provided for the device according to the disclosure.

In one exemplary arrangement, the form cutter has a substantially conical tip, and in one exemplary arrangement, with a flattened end piece.

An opening intersecting the at least one borehole is understood, in the context of the disclosure, as being an opening, the outside diameter of which intersects an outside diameter of the borehole at two points, such that a part of the circular area of the at least one bore and a part of the circular area of the opening overlap.

In one exemplary arrangement, provision is made that the device removes the at least one burr in an automated manner, i.e. that the form cutter is plunged in an automated manner into the opening intersecting the borehole and is then rotated. This represents a significant simplification compared with the removal of the burr by a human operator, as is conventional in the prior art.

According to one exemplary arrangement of the disclosure, the form cutter has a multiplicity of shearing edges which are configured to remove the at least one burr by shearing it off. In one exemplary arrangement, the shearing edges have an edge angle of 90° and are configured to be as sharp-edged as possible. If the form cutter now plunges into the opening intersecting the at least one borehole, its shearing edges lie on the outer circumference of the opening intersecting the at least one borehole and thus also on that part of the outer circumference of the at least one borehole that possibly has the burr or burrs. The shearing edges allow uniform and easy removal of the at least one burr.

According to one exemplary arrangement of the disclosure, the shearing edges are each arranged in pairs on the two circumferential sides of land ridges. The land ridges form the radial and optionally axial outer sides of blade-like lands and are flattened radially and axially toward the outside. In one exemplary arrangement, the lands in turn are produced by cutting away the material of the form cutter between the lands. The lands thus represent the non-removed material regions. Since the shearing edges are arranged on both sides of each land ridge in the circumferential direction, the form cutter can be rotated about its longitudinal axis in both possible directions of rotation in order to remove the at least one burr.

In one exemplary arrangement, the form cutter has twelve land ridges with a total of twenty-four shearing edges.

According to a further exemplary arrangement of the disclosure, the land ridges are formed with three steps, wherein a first portion is formed parallel to a longitudinal axis of the form cutter, wherein a second portion exhibits a first angle with respect to the longitudinal axis, and wherein a third portion exhibits a second angle with respect to the longitudinal axis, wherein the second angle is greater than the first angle. This results in an advantage that the form cutter is adaptable largely optimally to the opening intersecting the at least one borehole via a number of adjustable parameters, namely the first, second and third portion, and the first, second and third angle, in order to allow the at least one burr to be removed as easily, quickly and cleanly as possible.

According to a further exemplary arrangement of the disclosure, the third portion is configured to center the form cutter in the opening intersecting the at least one borehole and the second portion is configured to remove the at least one burr. This results in the advantage that the form cutter can be adapted so precisely to the opening intersecting the at least one borehole that it is initially oriented coaxially with the longitudinal axis of the opening intersecting the at least one borehole on account of the geometry of the third portion. The orientation and centering take place here in that the form cutter is plunged into the opening intersecting the at least one borehole until the third portion, i.e. the axially outermost portion, comes to bear with its land ridges on an inner circumference of the opening. Furthermore, the shearing edges lie, in the region of the second portion, on account of the second angle, more or less exactly on the outer circumferential line of the at least one borehole, advantageously in precisely that region that optionally has the at least one burr. Thus, the form cutter can be plunged easily and quickly into the opening intersecting the at least one borehole and be rotated, without complicated centering or orientation, in order to remove any burrs that may be present.

According to a further exemplary arrangement of the disclosure, the form cutter is configured to widen an outer circumference of the opening intersecting the at least one borehole by cutting it during deburring. This thus means that the form cutter bears on the outer circumference with its land ridges and the shear edges arranged laterally thereon, in particular in the region of the second portion. As a result of the form cutter being rotated when the form cutter is urged by a predetermined pressure against the opening intersecting the at least one borehole, it is now also possible for a predefinable amount of material to be cut away from the outer circumference thereof, such that the outer circumference is accordingly widened. This results in the advantage that the at least one burr that is possibly present can be removed very reliably, since the form cutter in this case even removes additional material beneath the at least one burr.

According to a further exemplary arrangement of the disclosure, the device comprises an automated plunging mechanism which is configured to plunge the form cutter into the opening intersecting the at least one borehole. This results in the advantage that the removal of the at least one burr can take place largely or entirely in an automated manner. In particular, manual actuation of the device is not necessary in order to plunge the form cutter into the opening intersecting the at least one borehole.

In one exemplary arrangement, the device furthermore comprises a feed mechanism, which in one particular exemplary arrangement is in the form of a conveyor belt. The feed mechanism allows a multiplicity of workpieces to be fed to the device in an automated manner. In this case, both the feed of the workpieces and the deburring of the workpieces can take place largely or entirely in an automated manner.

The disclosure also relates to a method for deburring at least one borehole in a metal workpiece, wherein the at least one borehole is deburred by means of a rotationally symmetric form cutter. The method according to the disclosure is noteworthy in that the at least one borehole is deburred in that the form cutter is plunged into an opening intersecting the at least one borehole and rotated. The method according to the disclosure thus describes a use according to the disclosure of the device according to the disclosure. This results in the advantages already mentioned in conjunction with the device according to the disclosure also being achieved for the method according to the disclosure.

According to a one exemplary arrangement of the disclosure, a multiplicity of boreholes are deburred simultaneously. Thus, the deburring of the workpiece can take place comparatively quickly and in a time-saving manner, since not every borehole has to be deburred individually. This in turn increases the throughput in particular during industrial manufacture and reduces the unit costs for the workpiece.

According to a further exemplary arrangement of the disclosure, the form cutter is centered in the opening intersecting the at least one borehole before deburring. The centering takes place advantageously only on account of the geometry of the form cutter and the geometry of the opening intersecting the at least one borehole when the form cutter is plunged into the opening.

BRIEF DESCRIPTION OF DRAWINGS

The disclosure is explained by way of example in the following text on the basis of embodiments illustrated in the figures, wherein.

DETAILED DESCRIPTION

Identical items, functional units and comparable components are provided with the same reference signs throughout the figures. These items, functional units and comparable components are embodied identically in terms of their technical features, unless something else becomes explicitly or implicitly apparent from the description.

Figure 1:
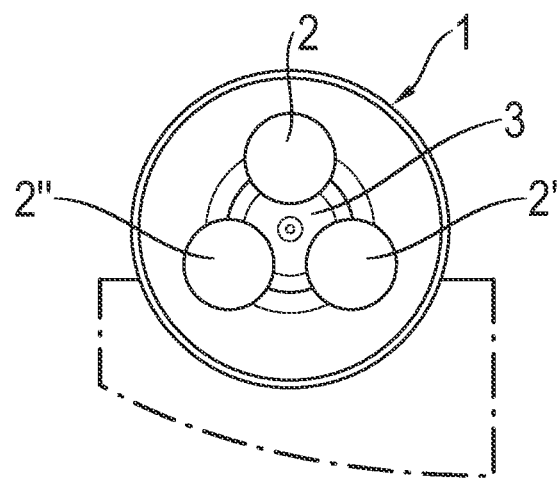
FIG. 1 shows, by way of example and schematically, a metal workpiece which is intended to be deburred by a device according to the disclosure.

FIG. 1 shows, by way of example and schematically, a metal workpiece 1 which is intended to be deburred by a device 10 (not illustrated in FIG. 1) according to the disclosure. The workpiece 1 is, according to the example, a shaft 1, produced from steel, of a transmission (likewise not illustrated). The workpiece 1 has three boreholes 2, 2', 2", which are intended, according to the example, to guide oil. As is also apparent, the workpiece 1 has an opening 3 intersecting the three boreholes 2, 2', 2". The opening 3 has a parabolic cross-sectional area along the longitudinal axis of the workpiece 1, which has been produced, according to the example, by application of a parabolic drill bit. As a result of the parabolic cross-sectional area, the opening 3, cooperating with a form cutter 11 of corresponding shape, can center and orient the latter as soon as it plunges into the opening 3 and comes into contact with the inner circumference of the opening 3. According to the example, the workpiece 1 has already been deburred by the device 10 according to the disclosure, and so no burr 4 is illustrated in FIG. 1.

Figure 2:
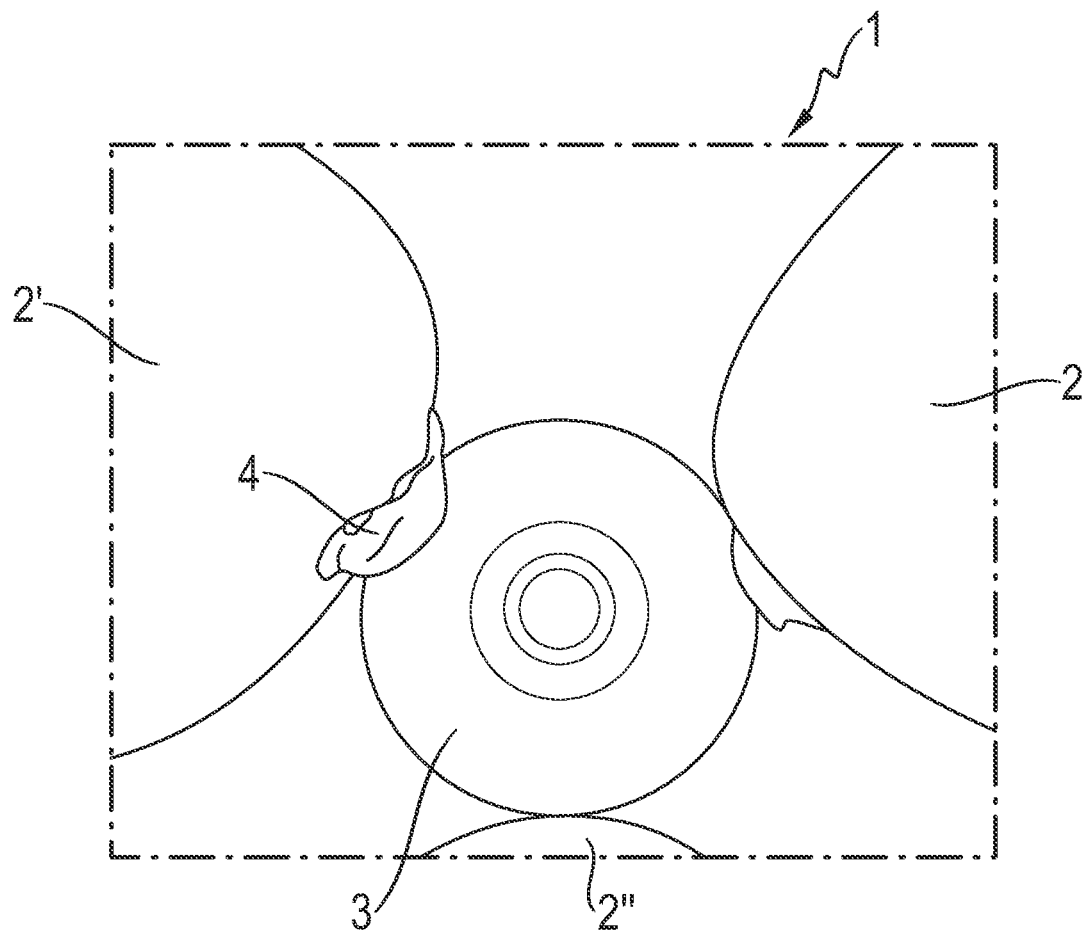
FIG. 2 shows, by way of example and schematically, a detail of a subregion of a metal workpiece, FIG. 3 Shows, by way of example and schematically, a possible exemplary arrangement of a form cutter of a device according to the disclosure.

FIG. 2 shows, by way of example and schematically, a detail of a subregion of a metal workpiece 1. Visible to some extent are the boreholes 2, 2' and 2" and the opening 3 intersecting the three boreholes 2, 2', 2". As is also visible, there is a burr 4 on the outer circumference of the borehole 2'. The burr 4 is located precisely in that region of the outer circumference of the borehole 2' that lies in the region of the opening 3. Thus, the burr 4 can be removed easily in that a form cutter 11 of the device 10 (neither of which is illustrated in FIG. 2) is plunged into the opening 3 and is rotated. If burrs were likewise to have arisen on the outer circumferences of the boreholes 2, 2", these could be removed simultaneously and in the same operation as the burr 4 on the borehole 2'.

Figure 3:
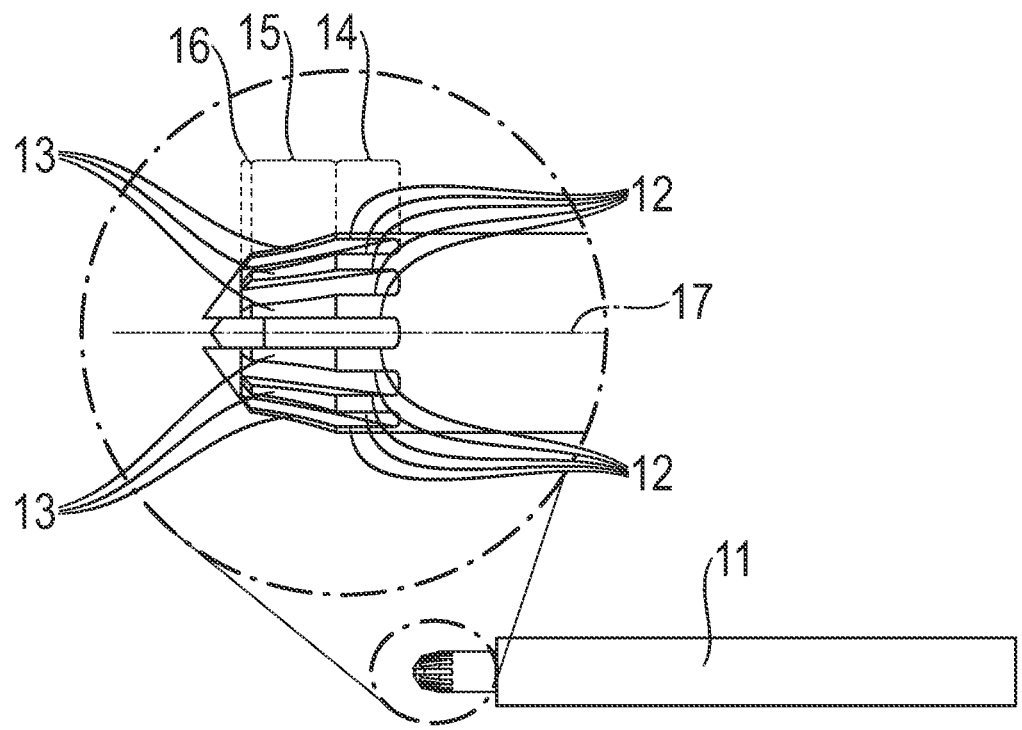

FIG. 3 shows, by way of example and schematically, a possible exemplary arrangement of a form cutter 11 of a device 10 according to the disclosure. The form cutter 11 is configured to remove at least one burr 4 from the at least one borehole 2, 2', 2" in that it is able to be plunged into the opening 3 intersecting the at least one borehole 2, 2', 2" and rotated. As can be seen, the form cutter 11 has a multiplicity of shearing edges 12, which are configured to remove the at least one burr 4 by shearing it off. The shearing edges 12 are in this case each arranged in pairs on the two circumferential sides of land ridges 13. By way of example, the form cutter 11 in FIG. 3 has twelve land ridges with 24 shearing edges 12. As is also illustrated in FIG. 3, the land ridges 13 are formed with three steps, wherein a first portion 14 is formed parallel to a longitudinal axis 17 of the form cutter 11, wherein a second portion 15 exhibits a first angle with respect to the longitudinal axis 17, and wherein a third portion 16 exhibits a second angle with respect to the longitudinal axis 17, wherein the second angle is greater than the first angle. The third portion 16 is configured to center the form cutter 11 in the opening 3 intersecting the at least one borehole 2, 2', 2" and the second portion 15 is configured to remove the at least one burr 4. To this end, the opening 3 has, according to the example, a parabolic cross-sectional area, to which the geometry of the form cutter 11, i.e. the first portion 14, the second portion 15 and the third portion 16, or the first angle, the second angle and the third angle, are adapted.

When the form cutter 11 is plunged into the opening 3, the form cutter 11 is plunged in far enough for the land ridges 13 to come into contact, in the portion 16, with the circumference inside the opening 3. As a result, the form cutter 11 is automatically centered and oriented coaxially with a longitudinal axis of the opening 3. In this position, the portion 15 of the form cutter 11 lies on an outer circumference of the opening 3. If the form cutter 11 is now rotated, it shears off, with the shearing edges 12, any burrs 4 that may be present in the portion 15 in those regions of the outer circumference of the boreholes 2, 2', 2" that overlap the circumference of the opening 3.

Figure 4:
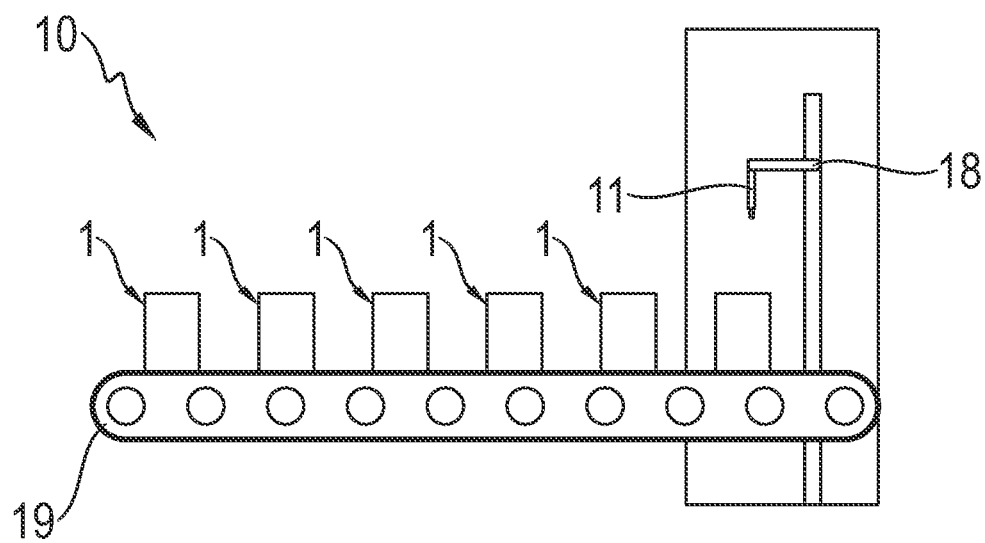
FIG. 4 shows, by way of example and schematically, a possible exemplary arrangement of a device according to the disclosure.

FIG. 4 shows, by way of example and schematically, a possible exemplary arrangement of a device 10 according to the disclosure. According to the example, the device 10 comprises an automated plunging mechanism 18, which is configured to plunge the form cutter 11 into the opening 3, intersecting the at least one borehole 2, 2', 2", in the workpieces 1. The device 10 also comprises a conveyor belt 19 by which a multiplicity of workpieces 1 can be fed in an automated manner to the device 10. According to the example, both the feeding of the workpieces 1 and the deburring of the workpieces 1 take place in an entirely automated manner.

The invention claimed is:

1. A device for deburring at least one borehole in a metal workpiece, the device comprising a rotationally symmetric form cutter, the rotationally symmetric form cutter including a plurality of shearing edges and a plurality of land ridges, wherein each shearing edge of the plurality of shearing edges is arranged in pairs on two circumferential sides of a respective land ridge, wherein the form cutter is configured to remove at least one burr from the at least one borehole in that it is able to be plunged into an opening intersecting the at least one borehole and rotated.

2. The device as claimed in claim 1, wherein each land ridge of the plurality of land ridges comprise a first portion, a second portion, and a third portion, wherein the first portion is formed parallel to a longitudinal axis of the form cutter, wherein the second portion comprises a first angle with respect to the longitudinal axis, and wherein the third portion comprises a second angle with respect to the longitudinal axis, wherein the second angle is greater than the first angle.

3. The device as claimed in claim 2, wherein the third portion is configured to center the form cutter in the opening intersecting the at least one borehole and the second portion is configured to remove the at least one burr.

4. The device as claimed in claim 2, wherein the form cutter is configured to widen an outer circumference of the opening intersecting the at least one borehole by cutting it during deburring.

5. The device as claimed in claim 2, wherein the device comprises an automated plunging mechanism which is configured to plunge the form cutter into the opening intersecting the at least one borehole.

6. The device as claimed in claim 5, wherein the third portion is configured to center the form cutter in the opening intersecting the at least one borehole and the second portion is configured to remove the at least one burr.

7. The device as claimed in claim 1 wherein the form cutter is configured to widen an outer circumference of the opening intersecting the at least one borehole by cutting it during deburring.

8. The device as claimed in claim 1, wherein the device comprises an automated plunging mechanism that is configured to plunge the form cutter into the opening intersecting the at least one borehole.

9. The device as claimed in claim 1, wherein the form cutter is configured to widen an outer circumference of the opening intersecting the at least one borehole by cutting it during deburring.

10. The device as claimed in claim 1, wherein the device comprises an automated plunging mechanism that is configured to plunge the form cutter into the opening intersecting the at least one borehole.

11. A method for deburring at least one borehole in a metal workpiece, comprising deburring the at least one borehole by applying a rotationally symmetric form cutter to the workpiece, the rotationally symmetric form cutter including a plurality of shearing edges and a plurality of land ridges, wherein each shearing edge of the plurality of shearing edges is arranged in pairs on two circumferential sides of a respective land ridge, wherein each land ridge of the plurality of land ridges comprises a first portion, a second portion, and a third portion, wherein the first portion is formed parallel to a longitudinal axis of the form cutter, wherein the second portion comprises a first angle with respect to the longitudinal axis, and wherein the third portion comprises a second angle with respect to the longitudinal axis, wherein the second angle is greater than the first angle, wherein the at least one borehole is deburred by plunging the form cutter into an opening intersecting the at least one borehole and rotating the form cutter.

12. The method as claimed in claim 11, wherein multiple boreholes are deburred simultaneously.

13. The method as claimed in claim 12 wherein the form cutter is centered in the opening intersecting the at least one borehole before deburring.

14. The method as claimed in claim 11 wherein the form cutter is centered in the opening intersecting the at least one borehole before deburring, wherein the third portion is configured to center the form cutter in the opening intersecting the at least one borehole and the second portion is configured to remove the at least one burr.

* * * * *